Sept. 8, 1931.  E. J. PILBLAD  1,822,235
SUPPORTING MEANS FOR SPRING SUSPENSION DEVICES FOR VEHICLES
Filed Aug. 17, 1925  3 Sheets-Sheet 1
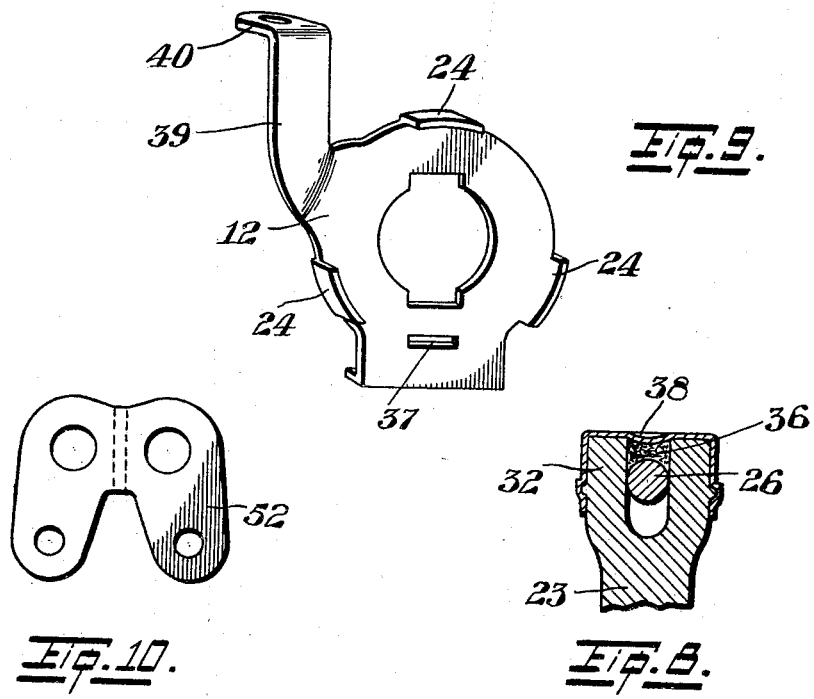
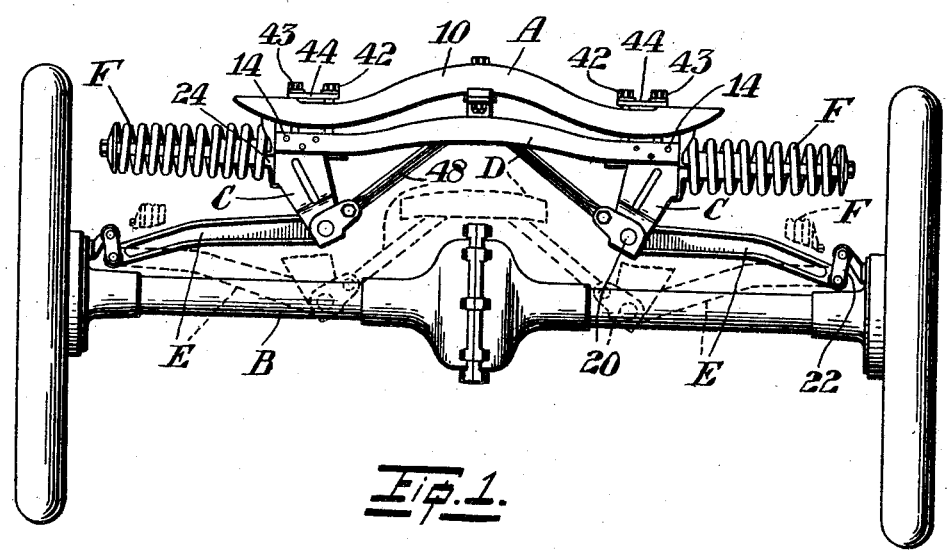
INVENTOR.
ERIC J. PILBLAD.
BY Fetherstonhaugh & Co.
ATT'YS.

Sept. 8, 1931. E. J. PILBLAD 1,822,235
SUPPORTING MEANS FOR SPRING SUSPENSION DEVICES FOR VEHICLES
Filed Aug. 17, 1925 3 Sheets-Sheet 2

INVENTOR
ERIC. J. PILBLAD.
BY Fetherstonhaugh & Co.
ATT'YS.

Sept. 8, 1931.  E. J. PILBLAD  1,822,235
SUPPORTING MEANS FOR SPRING SUSPENSION DEVICES FOR VEHICLES
Filed Aug. 17, 1925  3 Sheets-Sheet 3

INVENTOR.
ERIC. J. PILBLAD.
BY Featherstonhaugh & Co.
ATT'YS.

Patented Sept. 8, 1931

1,822,235

UNITED STATES PATENT OFFICE

ERIC JULIUS PILBLAD, OF BROOKLYN, NEW YORK, ASSIGNOR, BY MESNE ASSIGNMENTS, TO LEOPARD AUTOMOBILE PRODUCTS CORPORATION, OF NEW YORK, N. Y., A CORPORATION OF DELAWARE

SUPPORTING MEANS FOR SPRING SUSPENSION DEVICES FOR VEHICLES

Application filed August 17, 1925. Serial No. 50,669.

This invention relates to supporting means for spring suspension devices for vehicles, particularly to those in which the load is supported through the medium of spring held rocker arms, and the objects of the invention are generally to improve and simplify the construction of the supporting means of a device of this kind as well as to effect certain improvements in the operative parts of the device itself to better adapt the same to perform the function required.

Further objects are to enable two of said devices to be attached in position as a unit and with a minimum expenditure of labor.

Further objects still are to provide effective means for resisting the lateral and torsional strains to which the device is subjected in use.

With these and other objects in view, the invention consists of the improved construction and arrangement of parts hereinafter described in detail in the accompanying specifications and drawings.

In the drawings:

Figure 1 is a rear elevation showing the spring suspension devices in position in relation to the rear axle and chassis of an automobile, the lowermost position of the body being indicated in dotted lines.

Figure 8 is a section on the line 8—8 of Figure 2.

Figure 9 is a perspective view of the spring supporting connecting plate.

Figure 10 is a plan of the blank from which the bracket connecting plate is formed.

In the drawings like characters of reference indicate corresponding parts in all the figures.

Figure 3:
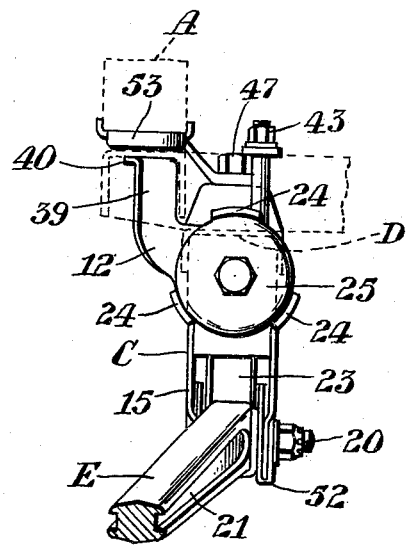
Figure 3 is an end elevation.
Figure 2:
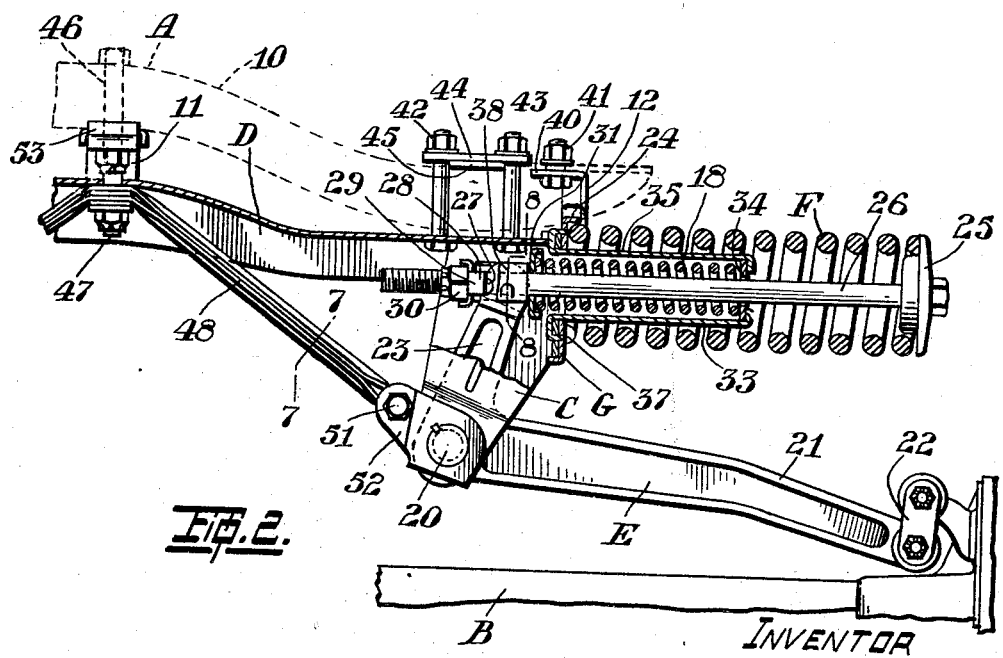
Figure 2 is a sectional elevation through one of the spring suspension devices.
Figure 6:
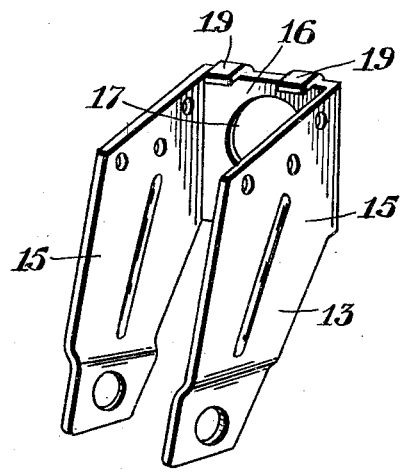
Figure 6 is a perspective detail showing a portion of the supporting member for the rocker arm.
Figure 4:
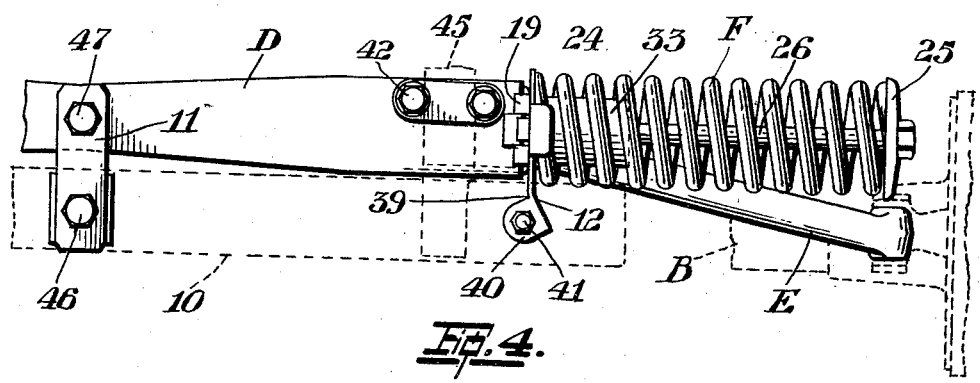
Figure 4 is a plan view with the portions of the chassis and axle of the vehicle indicated in dotted lines.

Referring to the drawings, A indicates the chassis of a vehicle and B an axle thereof. Two spring suspension devices C are secured to opposite extremities of a transverse supporting member or beam D which is supported from the transverse beam 10 which forms part of the chassis A. The transverse supporting member D is preferably of channel form and is shaped somewhat similar to the member 10 being connected thereto by a central connecting strap 11 as well as by connection plates 12 which form part of the spring suspension devices C. The beam D is preferably widened laterally at opposite ends as indicated in Figure 4, and widened vertically at the center as indicated in Figures 1 and 2 to thereby enable it to more effectively support the load.

Each of the spring suspension devices C includes a supporting member G, formed by a bracket member 13 and the plate 12. The bracket member 13 is fixedly secured to the extremity of the beam D as by rivets 14, the sides 15 of the bracket member fitting within the sides of the channel which forms the beam D. The bracket member is also formed with an end plate 16 having a central opening 17 through which the rebound checking spring 18 may extend, and also being provided on the upper edge with projecting and bent over lugs 19, which are designed to extend over the top of the beam D to assist in holding the bracket in a fixed position.

The lower portion of the bracket 13 is adapted to support and journal the cross pin 20 on which the rocker arm E is mounted, the latter being in the form of a bell crank lever having its long arm 21 connected to the axle of the vehicle by a connecting device 22, the short arm 23 of the rocker arm projecting upwardly within the side plates 15 of the bracket 13.

F indicates a load supporting spring which extends from the supporting member G constituted by the bracket being seated within projecting flanges 24 formed on the plate 12, the opposite end of the load supporting spring being engaged by a washer 25 mounted on the extremity of a tie-rod 26, the opposite end of which has loose rocking connection with the arm 23 of the rocker arm E. This loose rocking connection is effected by means of a roller 27 mounted in a suitable recess in the extremity of the arm 23 which is engaged by flanges 28 on washer plate 29 bearing against a castellated nut 30 mounted on the screw-threaded end of the tie-rod 26 and held in adjusted position by a suitable split pin extending through the tie-rod, this connection being the same as that illustrated and claimed in my co-pending application Serial No. 50,668, filed August 17, 1925.

18 indicates the rebound checking spring which is adapted to bear at one end directly against the flanged pressure plate 31 which bears against the ball shaped and bifurcated end 32 on the short arm 23 of the rocker arm E. The rebound checking spring extends within the load supporting spring F and is supported at its outer extremity by a connecting device 33 which includes a ring 34 bearing the outer end of the spring 18 and held in position by fingers 35 which extend at their inner end through the opening 17 in the plate 16 being bent to extend therethrough and suitably secured thereto as by spot welding, the bent edges of the fingers finally projecting through one or more slots 37 formed in the plate 12. A lubricating pad 36 may be conveniently held in contact with the ball shaped end 32 of the rocker arm E by means of a retaining member 38 of inverted U shape.

The plate 12, as already indicated, is designed to form part of a connection between the beams D and 10. It also serves to position the beam D. In order that it may perform these functions it is formed with a lateral projection 39 which has a flange 40 thereon fitting within and designed to be secured to the extremity of the beam A as by a bolt 41. Beam D is further held in position by bolts 42 and 43 extending therethrough as well as through the cross bar 44 which extends over and bears against the member 45 of the vehicle chassis.

The central connection between the beams 10 and D includes a bolt 46 extending through the beam 10 and connecting it with the strap 11 and a bolt 47 extending through the other end of the strap 11 and connecting it with the beam D.

Figure 7:
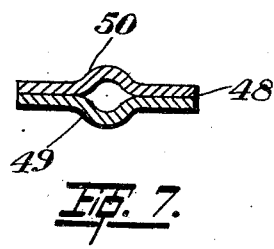
Figure 7 is a sectional detail on the line 7—7 of Figure 2.

To firmly hold the supporting member G from lateral displacement, I provide a tie-rod 48 conveniently formed from two sheet metal sections 49 and 50 indicated in Figure 7. They are connected together at their extremities and formed with a ribbed portion at the center, the ribbed portion of each of the members projecting outwardly from each other to thereby form a central holow space. The tie-rod at its center is designed to be supported by the bolt 47, the opposite sides of the tie-rod being bent diagonally and connected to the bracket member G by means of cross pins 51 which are journaled in the extremity of the tie-rod and connected by connecting plates 52 to the bracket G, the side connecting plates extending around the pin 20 forming a support for the same from the tie-rod 48 and through the pin 20, serving to support the bracket member G.

Figure 5:
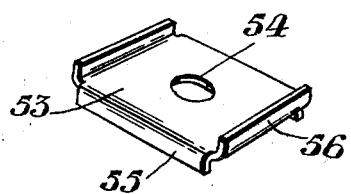
Figure 5 is a perspective detail of the connecting plate fitting around the central connection bolt which extends between the cross beam of the chassis and the transverse supporting member of the device.

In order to hold the strap 11 in proper angular position, I conveniently provide a plate 53 having an aperture 54 through which the bolt 46 extends, the said plate having downwardly turned flanges 55 which engage the strap 11 and upwardly turned flanges 56 which engage the beam 10 (see Figure 5).

In the operation of the device, when any sudden bump or irregularity in the road is encountered, the vehicle body moves downwardly while the load supporting spring F is compressed, finally reaching the limit of compression when the return movement takes place, the rocker arm E during this return movement compressing the spring 18 which opposes the rebound. If the springs are suitably proportioned to the load to be carried by the vehicle, it will be observed that the arrangement is such that both springs continuously exert a pressure against the short arm 23 of the rocker arm E which forms a connecting member between the supporting member G and the axle B. The rebound checking spring is preferably of such nature that it will not be completely distended until the load supporting spring reaches its completely compressed position. In this way there will be no slap or jump in transmitting the load from one spring to the other. It will also be observed that the location of the springs F and 18 one within the other enables a considerable economy in space to be effected and that the form of rocking connection between the tie-rod 26 and the arm 23 enables the relative motion to take place freely and without binding action.

The spring suspension devices herein disclosed may be used separately and they may be applied to a variety of different types of vehicles. The improved construction is of particular advantage since it may be attached to an automobile or similar vehicle in a very short space of time by reason of the fact that the two spring suspension devices C and beam D may be applied as a unit which is correctly located in operative position by means of the bolts 41 and 46. These two bolts may be substituted for others of a standard automobile construction.

It may be also observed that the beam D, together with the tie-rod 48 constitutes in effect a trussed beam which forms a desirably rigid support for the spring suspension devices.

It will be observed that the supporting member G extends both upwardly and inwardly and that while the rocker arm E projects laterally from one side of the supporting member, the tie-rod extends diagonally from the opposite side, thus forming an effective support for the bracket and the rocker arm. In fact the tie-rod gives firm support to the pivot pin 20 which also serves as the pivotal support for the rocker arm.

As many changes could be made in the above construction, and many apparently widely different embodiments of my invention, within the scope of the claims, constructed without departing from the spirit or scope thereof, it is intended that all matter contained in the accompanying specification and drawings shall be interpreted in an illustrative and not in a limiting sense.

What I claim as my invention is:

1. In a device of the character described, in combination, a plurality of spring suspension devices each including a bracket and a spring-held rocker arm, a detachable supporting member including a trussed beam constituting a single supporting means for said suspension devices enabling the latter to be attached or detached as a unit with said trussed beam.

2. In a device of the character described, in combination, a plurality of spring suspension devices each including a spring-held rocker arm, a detachable supporting member constituting a single supporting means for said suspension devices enabling the latter to be attached or detached as a unit with the supporting member, and a tie rod supporting said suspension devices at a point removed from the detachable supporting member.

3. In a device of the character described, in combination, a plurality of spring suspension devices each including a spring-held rocker arm, a detachable supporting member constituting a single supporting means for said suspension devices enabling the latter to be attached or detached as a unit with the supporting member, and a tie rod secured centrally to said supporting member and secured at its extremities to the spring suspension devices.

4. In a device of the character described, in combination, a plurality of spring suspension devices each including a spring-held rocker arm, a detachable supporting member constituting a single supporting means for said suspension devices enabling the latter to be attached or detached as a unit with the supporting member, and a two-part ribbed tie rod connecting said suspension devices.

5. In a device of the character described, in combination, a plurality of spring suspension devices each including a spring-held rocker arm, a detachable supporting member constituting a single supporting means for said suspension devices enabling the latter to be attached or detached as a unit with the supporting member, and a plurality of transverse connecting and locating members for said supporting member.

6. In a device of the character described, a supporting member for a spring held rocker arm comprising a bracket having side plates and an end section connecting the same and an end plate connected to the bracket having a lateral projection by which the same may be supported.

7. In a device of the character described, a pivoted spring held rocker arm, a supporting bracket for same comprising an end section and side plates, a pivot pin extending through the side plates constituting a support for the rocker arm, and an end plate fitting over the bracket.

8. In a device of the character described, in combination, a pivoted spring-held rocker arm, a supporting bracket for said rocker arm, including an end section and side plates, a pivot pin extending through said side plates constituting a support for the rocker arm, and an end plate fitting over the end section of said bracket and formed with laterally projecting flanges.

9. In a device of the character described, in combination, a plurality of spring suspension devices each including a spring-held rocker arm, a detachable supporting member constituting a single supporting means for said suspension devices enabling the latter to be attached or detached as a unit with the supporting member, a central connecting strap for said supporting member, and means for positioning said strap upon the vehicle chassis to anchor said strap against lateral turning.

10. In a device of the character described, in combination, a plurality of spring suspension devices each including a spring-held rocker arm, a detachable supporting member constituting a single supporting means for said suspension devices enabling the latter to be attached or detached as a unit with the supporting member, a connecting strap for said supporting member, and a positioning plate for said connecting strap having upturned flanges on one side and downturned flanges on the other side.

11. In a device of the character described, in combination, a plurality of spring suspension devices each including a spring-held rocker arm, a detachable supporting member constituting a single supporting means for said suspension devices enabling the latter to be attached or detached as a unit with the supporting member, said supporting member including a beam adapted to extend parallel to the rear beam of the vehicle chassis, and a plurality of laterally extending connecting members for said supporting member.

12. In a device of the class described and in combination, a supporting member, brackets at opposite ends thereof, pivoted spring held rocker arms on the brackets, a tie-rod, cross pins held in the ends of the tie-rod, plates connecting the cross pins with the tie rod, and plates connected to the tie-rod through said cross pins and also connected to said brackets.

13. A device of the class described, comprising a supporting bracket, a pivoted spring held rocker arm mounted on the supporting bracket, a tie-rod having a cross pin in the end thereof, and a plate connecting the cross pin with the bracket.

14. A device of the class described comprising in combination a supporting beam, brackets at opposite ends of the beam, spring held rocker arms on the brackets, and laterally projecting engaging means on the brackets designed to engage the chassis of a vehicle and to position the beam with respect to the same.

15. In a device of the class described, a supporting member, a pivotally mounted rocker arm on the supporting member, a load supporting spring on the supporting member, a tie-rod connecting the load supporting spring with one side of the rocker arm and having loose rocking contact therewith, a rebound checking spring engaging the opposite side of the rocker arm, means for supporting the rebound checking spring from the supporting member, and an oil retaining device loosely mounted on the end of the rocker arm.

16. In a spring suspension device for vehicles and in combination, a supporting member, a pivoted spring held rocker arm on the supporting member having a laterally extending arm on the lower part of the supporting member designed to be secured to the axle of a vehicle, and a tie-rod extending from the supporting member diagonally in the direction opposed to the direction in which the rocker arm extends.

17. In a spring suspension device for vehicles and in combination, a supporting member, a rocker arm, a pivot pin for the rocker arm on the lower part of the supporting member, rebound and load supporting springs operatively connected to the rocker arm, and a tie-rod connected to the pivot pin of the rocker arm.

18. In a device of the class described and in combination, a supporting beam, a supporting member extending downwardly from the end of the beam, a pivoted rocker arm at the extremity of the supporting member, load supporting and rebound checking springs connected to the rocker arm, and a tie-rod designed to give support to the supporting member and to the rocker arm substantially at the point at which the rocker arm is pivoted thereon.

19. In a device of the class described, in combination, a bracket designed to be secured to the chassis of a vehicle and to extend downwardly and inwardly therefrom, a pivoted rocker arm mounted on the lower part of the bracket, load supporting and rebound checking springs operatively connected to the rocker arm, and a tie-rod extending from the bracket diagonally and in a direction opposed to the projecting arm of the rocker arm.

In witness whereof I have hereunto set my hand.

ERIC JULIUS PILBLAD.